(12) United States Patent
Natarajan

(10) Patent No.: US 11,336,591 B2
(45) Date of Patent: May 17, 2022

(54) PRIORITY BASED ROUTE PROGRAMMING IN A NETWORK

(71) Applicant: VMware, Inc., Palo Alto, CA (US)

(72) Inventor: Vijai Coimbatore Natarajan, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 16/993,807

(22) Filed: Aug. 14, 2020

(65) Prior Publication Data
US 2022/0052967 A1 Feb. 17, 2022

(51) Int. Cl.
*H04L 49/90* (2022.01)
*H04L 45/02* (2022.01)
*H04L 47/2441* (2022.01)
*H04L 45/28* (2022.01)
*H04L 45/00* (2022.01)

(52) U.S. Cl.
CPC ........... *H04L 49/90* (2013.01); *H04L 45/02* (2013.01); *H04L 45/28* (2013.01); *H04L 45/54* (2013.01); *H04L 47/2441* (2013.01)

(58) Field of Classification Search
None
See application file for complete search history.

(56) References Cited

U.S. PATENT DOCUMENTS

| | | | | |
|---|---|---|---|---|
| 6,230,229 | B1* | 5/2001 | Van Krevelen | G06F 13/36 710/107 |
| 2002/0080795 | A1* | 6/2002 | Van Wageningen | H04Q 3/68 370/395.3 |
| 2008/0205422 | A1* | 8/2008 | Wang | H04L 47/2483 370/412 |
| 2014/0198662 | A1* | 7/2014 | Shimizu | H04L 45/122 370/238 |

* cited by examiner

*Primary Examiner* — Anh Ngoc M Nguyen

(57) ABSTRACT

In some embodiments, a method stores a plurality of requests for routes in a queue based on respective priorities for the routes. The plurality of requests are for programming destinations and next hops for the destinations in a route table that is used by a device in a network to route packets. The method selects a request for a route from the queue based on a respective priority for the queue. Then, the request for the route is sent to an entity to program the route in the route table.

20 Claims, 7 Drawing Sheets

PRIORITY BASED ROUTE PROGRAMMING IN A NETWORK

BACKGROUND

In a cloud data center, a cloud provider may offer network layer, such as Layer 3 (L3), connectivity via a physical network, which may be referred to as an underlay network. The system may include multiple workloads that are running on hypervisors on multiple hosts. The hosts may be connected via the underlay network, which may route packets for workloads running on the hosts. Some Internet Protocol (IP) addresses for the workloads or networks may need to be programmed in an underlay routing table in the underlay network. Routers in the underlay network use the routing table to route packets to a next hop to reach the workloads.

Also, in some examples, routes in the underlay routing table may need to be reprogrammed to change the next hop. For example, if an edge services gateway is being used in the system, several networks may be reachable via the edge services gateway. For these networks to be reachable from the underlay network, the networks are programmed in the underlay route table with a next hop that routes the packets on a path to the edge services gateway. Also, there may be other critical management appliances that push configurations to a data path for the hypervisor to forward traffic. When these edge services gateway and other management appliances are migrated from one host to another host, the routes for the management appliances need to be reprogrammed so that packets can be properly routed to the new host in the system.

The above situations may result in either a large number of routes being programmed in the underlay route table or multiple changes to routes in the underlay route table. A cloud provider may include a server, such as an application programming interface (API) server, that exposes an API that is used by hosts of the system to program routes in the underlay route table. The server may have threshold limits that restrict the number of routes that can be programmed in the underlay route table in a time period. If a large number of routes are being programmed at once, this may result in delays or failures for requests to program the routes. The delays or failures to program critical routes may cause problems in the system.

BRIEF DESCRIPTION OF THE DRAWINGS

With respect to the discussion to follow and in particular to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
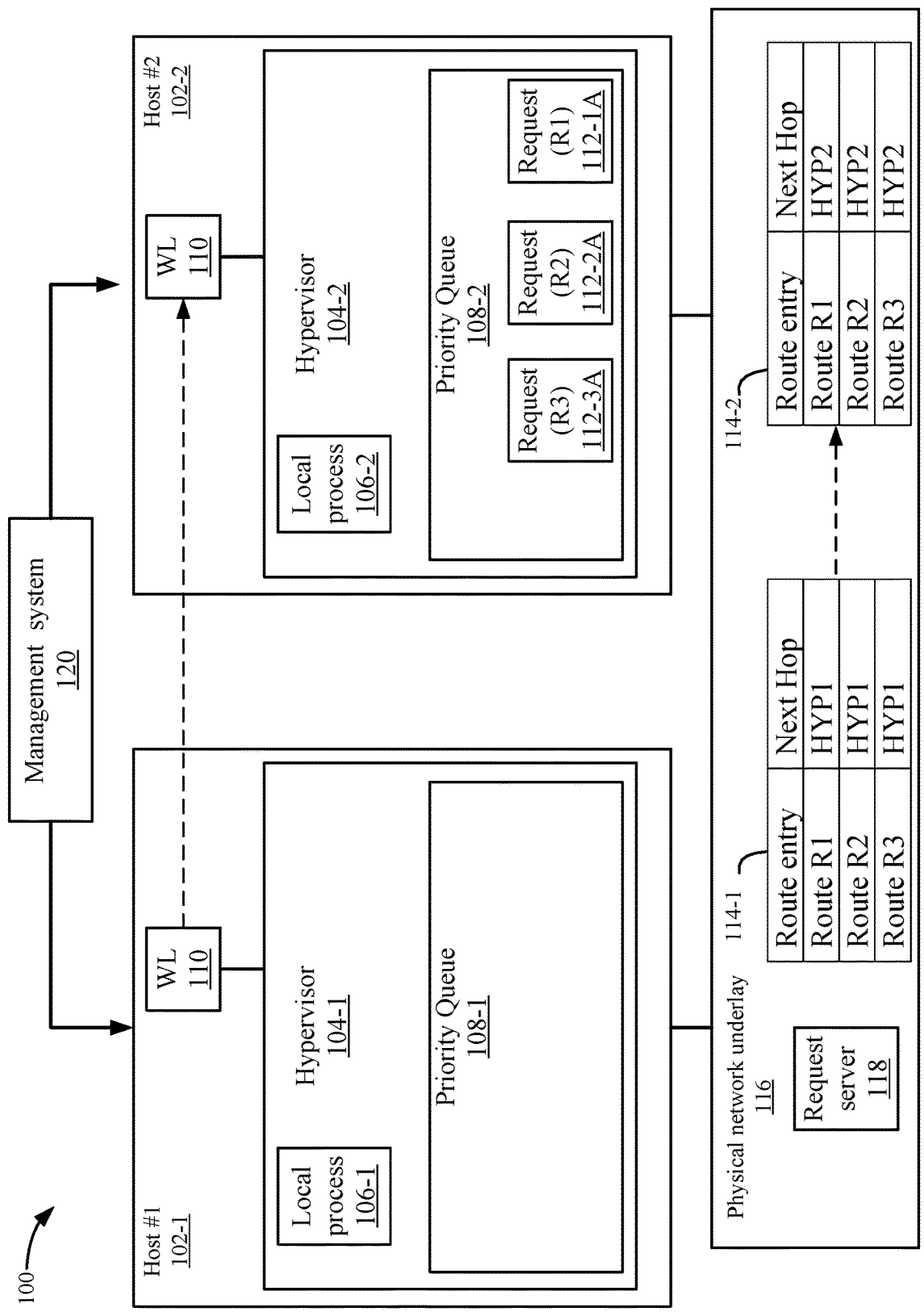
FIG. 1 depicts a simplified system for programming routes in a physical underlay network according to some embodiments.

In the following description, for purposes of explanation, numerous examples and specific details are set forth to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanism.

As discussed above in the Background, routes in the underlay route table may need to be programmed such that workloads can be reached via the underlay network. Some routes may be critical to the proper functioning of the system and need to be programmed as quickly as possible in the underlay route table. However, the server that programs the routes in the underlay network may introduce delays when programming the routes or reject some of the route programming requests. Furthermore, the hosts may not have control over the processing of the requests in the underlay network. Rather, a provider, such as a cloud provider, controls the server and how the requests are processed. To overcome the above problem, the system may classify routes to be programmed in the underlay route table based on a priority before sending the routes to the server for programming. A process uses the priority associated with routes to order requests to program the routes, such as the requests are ordered in a priority queue. The process uses the ordering in the priority queue to send higher priority requests for programming routes in the underlay route table before lower priority requests. Also, when requests are rejected by the server in the underlay network, the process may re-insert the requests in the queue based on the associated priority of the request. For example, when a high priority request is rejected by the server in the underlay network, the process may insert the high priority request at a position of the queue according to its priority such that the high priority request may be reissued sooner as compared to inserting the rejected request at the end of a first in first out (FIFO) queue that may order requests based on a time the request is inserted into the queue. For example, if the process inserts the rejected request in the first position of the queue, then the process will reissue the request next.

The use of the priority queue provides many advantages. Although the hosts do not have control over the processing of the requests at the server, the hosts can use the priority queue to prioritize the requests that are sent to the server. For example, critical requests may be programmed before less critical requests, which prioritizes the critical requests that may be time sensitive. Also, the re-insertion of rejected requests based on the priority may avoid having these requests wait behind other requests that are currently in the priority queue, which may reduce the delay to reissue the rejected request.

System Overview

FIG. 1 depicts a simplified system 100 for programming routes in a physical underlay network 116 according to some embodiments. System 100 includes a host #1 102-1 and a host #2 102-2; however, additional hosts may be appreciated. Hosts 102 may be referred to as computing devices, host computers, host devices, physical servers, server systems, physical machines. In some embodiments, hosts 102 may be network devices that process and send packets and include hardware resources including computer processor resources (not shown), memory resources (now shown), and physical network interface cards (PNICs) (not shown). PNICS couple hosts 102 to physical network underlay 116.

Each host 102 may be configured to support multiple networks (not shown) in which multiple workloads 110 run. For discussion purposes, only one workload 110 is shown, but multiple workloads may be running on networks. Workloads may refer to virtual machines that are running on a respective host, but this is one example of a virtualized computing instance or compute node. Any suitable technology may be used to provide a workload. Workloads may include not only virtual machines, but also containers (e.g., running on top of a host or guest operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers. Although a virtualized environment is described, some embodiments may be used in an environment that is not virtualized. Also, the term "workload" may refer to a host that is not virtualized.

A provider, such as a public cloud provider, may offer network layer, such as Layer 3, connectivity between hosts 102 via a physical network. For example, a physical network underlay 116 may include a network (not separately shown) that routes packets between host #1 102-1 and host #2 102-2 using networking devices (e.g., routers, not shown) that route packets based on a destination of the packet. For example, the routers may use an underlay route table 114 that includes route entries for destinations and respective next hops that are used to route the packets to the destinations of the packets. For example, a router may send a packet to the next hop associated with the destination address of the packet in underlay route table 114.

A local process 106 for a respective host 102 (e.g., local process 106-1 and 106-2) manages the programming of routes in underlay route table 114. Local process 106 may be running in hypervisor 104, or may be running elsewhere, such as in a workload running on hypervisor 104, or in another computing device. Local process 106 may send requests to program routes to a request server 118 in underlay 116, such as by using an API exposed by request server 118.

Request server 118 may be a physical or virtual computing device, such as a network controller, that receives the requests, such as via an API that is exposed to local processes 106. Request server 118 programs the routes in underlay route table 114 of one or more routers (not shown). Different routers in underlay 116 may use underlay route table 114 to route packets between hosts 102. For example, underlay route table 114 may include route entries that include a destination associated with an entity, such as a workload 110, and a next hop to route a packet to the destination as the next hop. A simplified version of underlay route table 114 is shown that indicates a route with a next hop. In the example, the destination is simplified as a route R1, R2, or R3 with a next hop that designates a hypervisor (HYP1). The route may be an IP address for a workload or a range of IP addresses for a network. The next hop may be information to route the packet to the respective hypervisor 104 or to an entity that can route the packet to the network. For example, the route may identify an address range for a subnetwork that is reachable via workload 110 when workload 110 is operating as an edge services gateway. Also, the route may identify an address for a specific workload, such as workload 110.

As mentioned above, the cloud provider may control request server 118 and the processing of requests at request server 118. To assert some control over processing of requests to program routes in underlay route table 114, hypervisors 104-1 and 104-2 (collectively hypervisor(s) 104) include a priority queue 108-1 and 108-2 (collectively priority queue 108), respectively, that local processes 106-1 and 106-2 use to order which requests to send to program routes in underlay route table 114. In some embodiments, local process 106 uses a priority associated with respective requests to order the requests in priority queue 108. Priority queue 108 may be implemented in different ways using various data structures. It will be recognized that the description of priority queue 108 may abstract the complexity of the queue and explain higher level operations of storing request in the queue without burdening the reader with unnecessary details of well-understood mechanisms. The abstractions in the descriptions of the queue should not be construed as limiting in any way. For example, request 112-1A, request 112-2A, and request 112-3A are shown in an order in priority queue 108-1. Different data structures may be used to implement the ordering of requests 112-1A to 112-3A based on priority in priority queue 108-1.

In some examples, local process 106-1 may send requests to request server 118 in an order as shown in priority queue 108-1 from highest to lowest priority (e.g., from left to right in FIG. 1). Requests 112 may be associated with different routes to program, such as request 112-1A programs a route R1, request 112-2A programs a route R2, and request 112-3A programs a route R3. A route may include a destination address, such as an IP address, and a next hop, such as another address or interface that is the next hop for a packet to reach the destination address. Although three requests are shown, priority queue 108-1 may also include other requests (not shown).

Local process 106 may send requests to program routes in underlay route table 114 for different reasons. For example, workload 110 may be reachable via underlay 116 and have routes for their IP addresses in underlay route table 114. In some cases, workload 110 may comprise an edge services gateway that provides connectivity to one or more overlay (software-defined) networks (not shown). Each overlay network may be implemented by a set of forwarding devices distributed on multiple hosts 102, which establish between them tunnels across the underlay thereby logically decoupling the overlay networks from underlay 116. For overlay networks to be reachable via the edge services gateway implemented by workload 110, routes for the overlay network need to be programmed with a next hop associated with the edge services gateway. As mentioned, there may be several networks in the data center that are reachable via the edge services gateway. Further, some of the networks may be reachable from a separate on premises data center via the edge services gateway.

In alternate scenarios, workload 110 may be a management appliance that pushes configurations to a managed forwarding element (not shown) implemented by each hypervisor 104 to forward traffic for overlay and/or underlay traffic. The routes for the management appliance are programmed in physical network underlay 116 to reach the other hypervisors. Other scenarios may also be appreciated where routes need to be programmed in underlay route table 114 with different priority.

In addition to programming routes in underlay route table 114, local process 106 may also need to reprogram routes in underlay route table 114. For example, when workload 110 migrates from host #1 102-1 to host #2 102-2, some routes may need to be programmed in underlay route table 114 to change the next hop for the destination. Before the migration from host #1 102-1 to host #2 102-2, underlay route table 114-1 includes route entries for routes R1, R2, and R3 that point to hypervisor 104-1 on which workload 110 is running. That is, packets sent to a destination for workload 110 may be routed as a next hop to reach hypervisor 104-1. However, when workload 110 migrates to host #2 102-2, workload 110 is reachable via hypervisor 104-2. Accordingly, requests 112-1A to 112-3A are generated by local process 106-1 to program routes R1 to R3 in underlay route table 114-1 with a next hop of hypervisor 104-2 (HYP2). In some embodiments, the requests may be associated with the address of workload 110 and/or networks behind workload 110 (e.g., if workload 110 is an edge services gateway). Request server 118 may receive and process the requests. This results in an underlay route table shown with entries at 114-2 where routes R1 to R3 now point to a next hop of hypervisor 104-2.

One scenario where routes need to be reprogrammed may occur when upgrades of software versions occur, such as at regular intervals of time. A customer may have several hosts 102 in the data center and each host 102 is upgraded as part of rolling upgrades. Before a host 102 is upgraded, the host is put into maintenance mode. In maintenance mode, all workloads 110 on that host 102 are migrated to other hosts in the data center. It is possible that the edge services gateway and other management appliances may be migrated several times during this upgrade process. This may result in a large number of routes to be programmed in underlay route table 114 due to the migrations. With a large number of routes, it may take a large amount of time (e.g., several minutes) for request server 118 to program the routes in underlay 116, which may result in brief service interruptions.

Accordingly, the above scenarios result in routes being programmed in underlay route table 114 where some routes may be more important to program than others. As discussed above, the cloud provider may maintain control over request server 118 and the programming of underlay route table 114 and request server 118 may not have a capability to prioritize processing of the requests according to relative importance. Also, if there are multiple customers using the cloud data center, request server 114 may not differentiate between different customers' requests. When request server 118 is overloaded with requests to program routes, the customer may have a large number of requests that experience delay or even be rejected. By using priority queue 108 in respective hosts, a customer may assert some control of the requests that are processed in underlay 116 even though the customer does not have control over the request server 118 that processes the requests in underlay 116. For example, prioritizing the routes to be programmed in underlay route table 114 is important when request server 118 is overloaded.

A management server 120 may provide priorities for entities to hosts 102. Then, local processes 106 use the priorities to send requests to underlay 116. Although management system 120 is shown as being separate from hosts 120, other processes may perform the functions of management system 120, such as one or more local processes 106, a workload, a host, etc. The use of priority to prioritize requests 112 will now be discussed.

Request Processing with Priorities

Management system 120 may assign priorities from a priority list that includes different priority levels. In some embodiments, the priority list may include categories that are used to assign priority levels to routes. Although the following priorities are described, other priorities may be used and assigned to routes. In some examples, some priorities for routes may be pre-defined and some priorities may be customized. The pre-defined priorities may be automatically assigned to routes that are associated with a respective category. For example, local process 106 assigns a first priority to routes associated with specified appliances, such as management appliances, that should be reachable with minimal or no downtime. Management appliances include edge services gateways, management appliances that configure network communications or manage devices or networks. In some embodiments, local process 106 assigns the management appliance category with a highest priority, but more than one priority level may be used for such management appliances.

A second pre-defined category may be routes associated with devices that perform network-based services, such as infrastructure endpoint services (e.g., a virtual private network (VPN) endpoint), a domain name server (DNS), firewall services, etc. Local process 106 may assign routes in this category with a second highest priority behind the management appliances, but, again, more than one priority level may be used for services.

Management system 120 may automatically assign the pre-defined priorities based on a definition of routes that are associated with the categories. Also, local process 106 may receive or be configured with the pre-defined priorities when management appliances or other devices are instantiated on a host 102.

Customized or default priorities may be associated with other routes that fall outside of the above categories. Also, the customized priorities may include different priority levels that can be assigned to specific routes. The following are some types of routes that may be included in underlay route table 114 and be assigned a customized priority. For example, if there are several logical networks in the data center, there may be several applications running on workloads connected through the logical networks. Some applications may be highly critical and other applications may be less critical. These routes associated with workload running the applications may be programmed with higher priority or a lower priority depending on the application. In some embodiments, even if logical networks use an overlay in the cloud data center, these networks may sometimes be exposed to routing in physical network underlay 116 when these networks are communicating to an on-premise data center or to cloud provider services in the data center. For example, some workloads may be migrated workloads from an on premises location outside of the cloud data center and these workloads may be connected over a Layer 2 virtual private network (L2 VPN) from the cloud data center to the on premises location. The routes may be associated with workloads on other networks could have a higher priority than routes for workloads that were not migrated from on premises. Also, some of the applications in workloads with routes in underlay route table 114 may be transferring critical data to the on-premise data center over these networks and some applications may be non-critical. Additionally, when workload 110 migrates from host #1 102-1 to host #2 102-2, the route associated with that workload 110 should be programmed in underlay route table 114 first such that workload 110 can be reached at host #2 102-2. Then, all the networks that are reachable via this workload 110 from physical network underlay 116 also have to be programmed. Accordingly, various different levels of priority may be used to classify the above routes.

Figure 2:
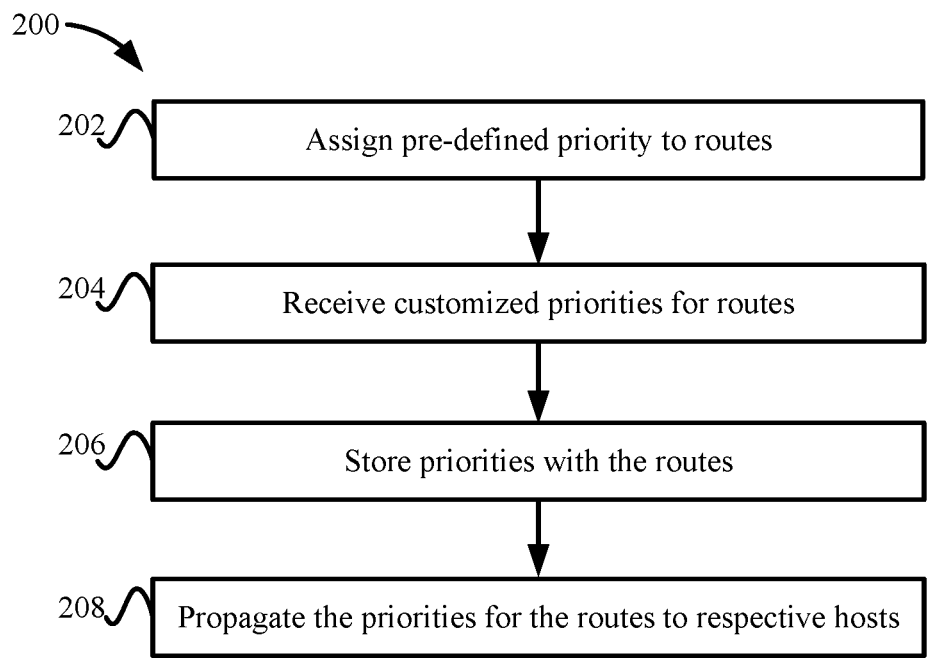
FIG. 2 depicts a simplified flowchart of a method for assigning priorities to routes according to some embodiments.

FIG. 2 depicts a simplified flowchart 200 of a method for assigning priorities to routes according to some embodiments. Management system 120 may perform the following configuration, but other systems, such as local process 106, may be used. Management system 120 may be running on a cluster of computing devices which may or may not be part of hosts 102. At 202, management system 120 assigns a pre-defined priority to routes. As discussed above, the pre-defined priority may be associated with higher priority routes that should be programmed before other routes. However, the pre-defined priority may be associated with other types of routes, such as assigning a lower priority to lower priority routes. Management system 120 may determine routes associated with the predefined categories and assign the pre-defined priorities to the routes. In some embodiments, management system 120 assigns the highest priority to routes associated with management appliances, such as with a priority referred to as a "1", and a second priority to routes associated with infrastructure services, such as with a priority referred to as "2". In this example, a lower priority value means the priority is higher in this priority scheme, but other priority schemes may be used.

At 204, management system 120 receives customized priorities for routes. Different priorities may be received from a customer that management system 120 can associate with routes. For example, the priority values may use the same scale that is associated with the pre-defined priority. In some examples, the customized priorities could be assigned a lower priority than the predefined priorities, such as a value of "3", "4", and so on. Other methods may use classifiers such as HIGHLY CRITICAL, CRITICAL, IMPORTANT, LESS IMPORTANT, etc. However, some customized priorities may be the same priority or higher priority than the predefined priorities. One reason the customized priorities are lower than the predefined priorities is because the pre-defined priorities are reserved for high priority entities. Different methods of receiving the priority for the customized priority may be appreciated. For example, input from a user or customer that is familiar with the routes may be received. Also, a system may automatically determine customized priorities, such as based on metadata or information describing the routes. For example, a route for a migrated workload from on premises may be automatically assigned a higher customized priority.

At 206, management system 120 stores priorities with the respective routes. For example, management system 120 may store IP addresses for routes with the priorities that are received.

Figure 3:
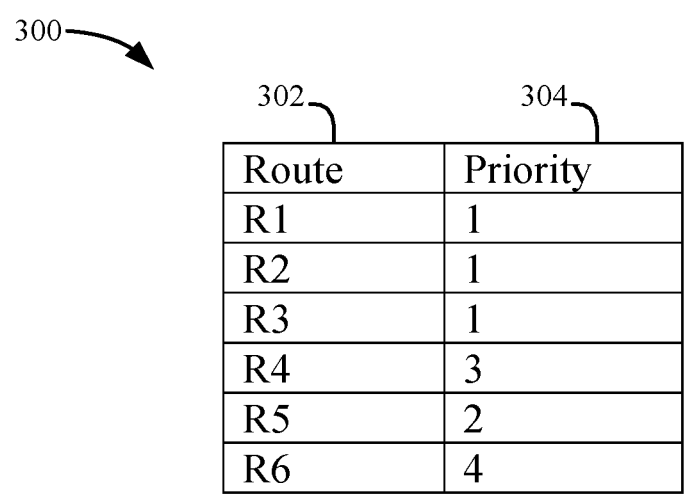
FIG. 3 depicts a table that shows routes and respective priorities according to some embodiments.

At 208, management system 120 propagates the priorities for the routes to the respective hosts 102. Then, the respective local process 106 in hosts 102 can use the priorities when programming routes in physical network underlay 116. FIG. 3 depicts a table 300 that shows routes and respective priorities according to some embodiments. Local processes 106 may store a data structure that represents data in table 300 to assign priorities to routes. The information in table 300 is simplified for discussion purposes, such as routes may be specific IP addresses or ranges of IP addresses. A column 302 lists the routes of R1 to R6. Then, a column 304 lists the priorities for the respective routes. As shown, routes R1, R2, and R3 have a priority of "1", which is the highest priority. A route R4 includes a priority of "3", route R5 includes a priority of "2", and a route R6 includes a priority of "4". Accordingly, route R5 is the next highest priority after routes R1 to R3 followed by route R4 and then route R6. In some embodiments, routes R1 to R3 may be associated with management appliances, route R5 may be associated with an infrastructure service, and routes R4 and R6 may be associated with other networks. Routes R4 and R6 may be customized by a customer and routes R1, R2, R3, and R5 may have pre-defined priorities.

Route Programming

Figure 4:
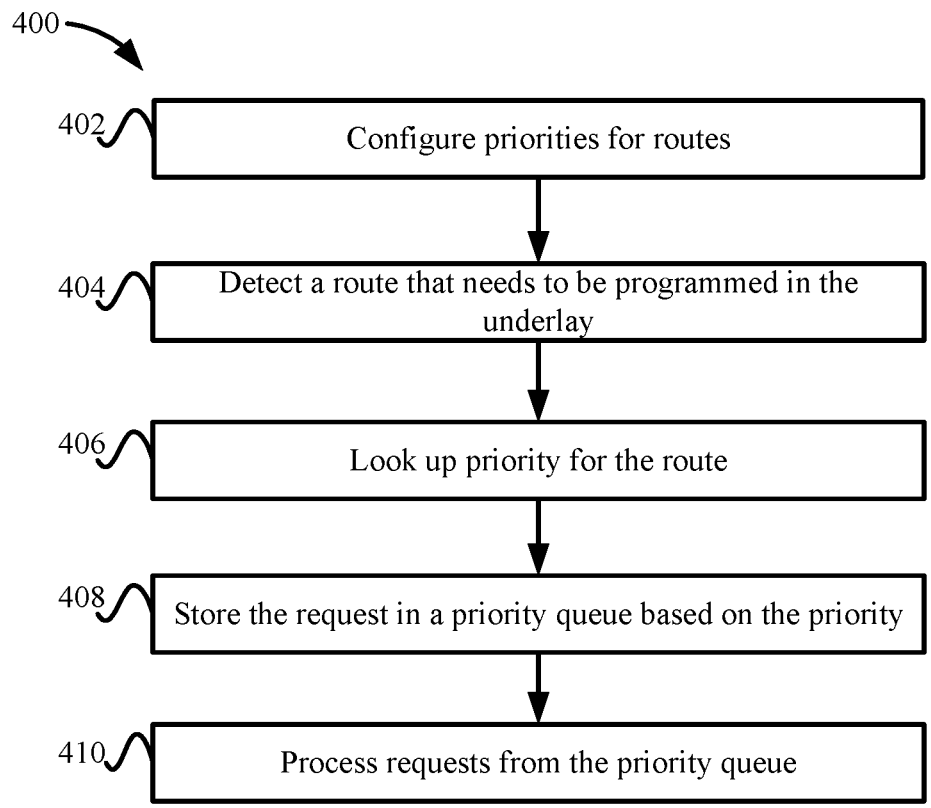
FIG. 4 depicts a simplified flowchart of a method for programming routes in an underlay according to some embodiments.

Once the priorities are assigned to routes, hosts 102 may use the priorities when programming routes in physical network underlay 116. FIG. 4 depicts a simplified flowchart 400 of a method for programming routes in underlay 116 according to some embodiments. Local process 106 is described as storing the requests in priority queue 108, but other processes, such as workloads 110, hypervisor 104, etc. may store requests in priority queue 108. At 402, local process 106 configures priorities for routes. For example, local process 106 may receive priorities for routes from management system 120 and store the priorities for the routes. At 404, local process 106 identifies a route that needs to be programmed into the underlay 116 and generates a request for the route. Local process 106 may use various processes to detect routes that need to be programmed in underlay 116. For example, when local process 106 detects a workload 110 is instantiated on a host 102, it may access configuration information for the workload that includes IP addresses associated with the workload that need to be reachable via underlay 116. In some examples, when local process 106 detects a workload 110 has migrated to the respective host 102, local process 106 may determine one or more routes that need to be reprogrammed for that workload 110. At 406, local process 106 looks up a priority for the route. For example, local process 106 may use the route to look up the priorities in table 300.

Figure 5:
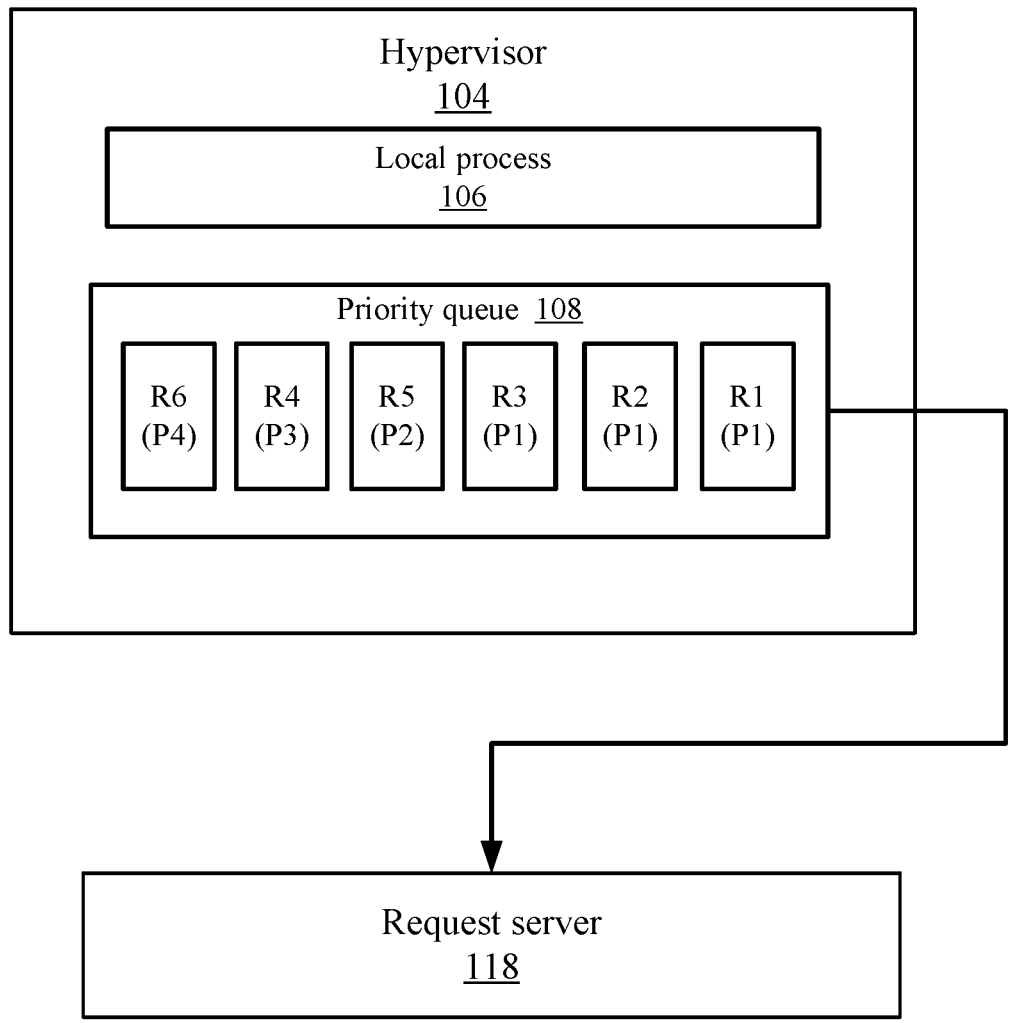
FIG. 5 depicts an example of the ordering of requests in a priority queue according to some embodiments.

At 408, local process 106 stores a request for the route in priority queue 108 based on the priority. FIG. 5 depicts an example of the ordering of requests in priority queue 108 according to some embodiments. Priority queue 108 includes requests for routes R1 to R6 that are arranged in an order from left to right by priority. The priorities are designated by P1 for a highest priority, P2 for a second highest priority, P3 for a third priority, and P4 for a fourth priority. The ordering may be conceptual and priority queue 108 may use different implementations to order routes by priority. In some examples, local process may insert a request in a position as the last request of the associated priority. For instance, if local process 106 inserts request R3 into priority queue 108 that already includes requests for routes R1, R2, R5, R4, and R6, local process 106 determines the requests with the same priority of request for route R3, which are requests for routes R1 and R2. Then, local process 106 inserts request for route R3 after the last request with the same priority. In this case, local process 106 inserts request for route R3 after request for route R2 and before request for route R5.

Referring to FIG. 4, at 410, local process 106 processes requests in priority queue 108. As discussed above, local process 106 processes the higher priority requests before processing lower priority requests. That is, requests having a higher priority are issued to the request server 118 ahead of requests having lower priority. In some embodiments, local process 106 processes requests from priority queue 108 based on an ordering of routes in priority queue 108. Referring to FIG. 5, local process 106 may process requests for routes R1 to R3 first and send these routes to request server 118 for programing underlay route table 114. Then, local process 106 processes requests for routes R5, R4, and R6 with respective priorities P2, P3, and P4 after routes R1 to R3. Accordingly, requests for routes R1 to R3 may experience less delay in programming the route in underlay 116 compared to requests for routes R4 to R6 because requests for routes R1 to R3 are sent before requests for routes R4 to R6.

Retrying of Routes

Figure 6:
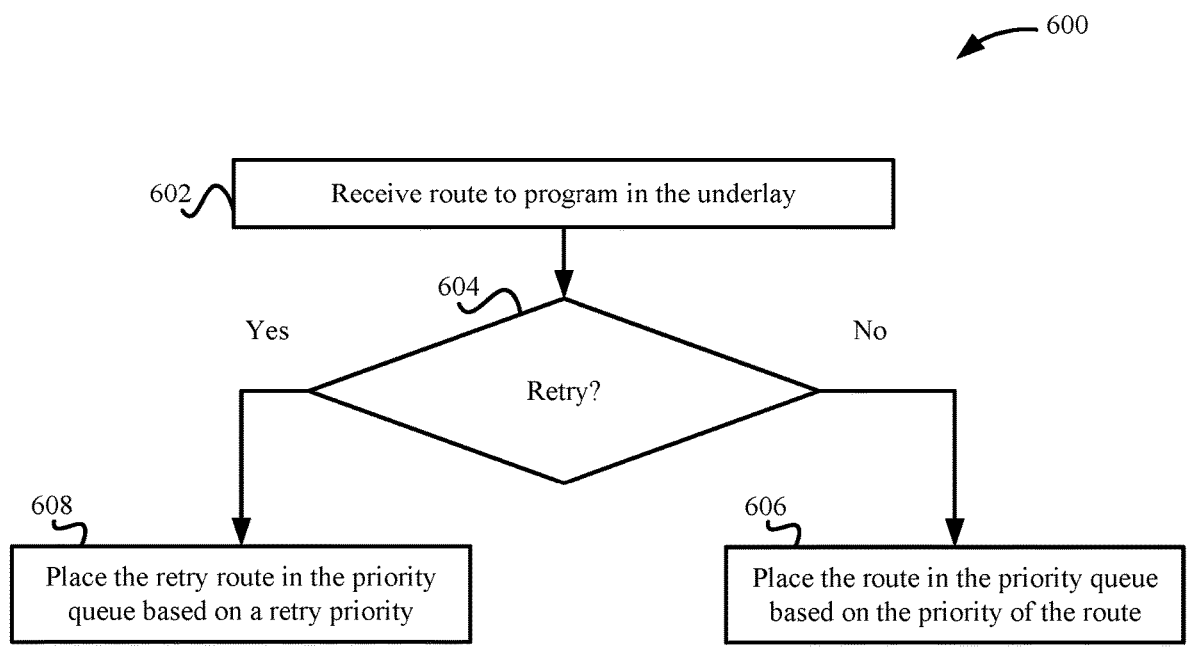
FIG. 6 depicts a simplified flowchart of a method for processing routes that need to be retried due to a failure according to some embodiments.

At times, the request to program a route may fail at request server 118. FIG. 6 depicts a simplified flowchart 600 of a method for processing routes that need to be retried due to a failure according to some embodiments. At 602, local process 106 receives a request for a route to program in underlay 116. The request may be a retry from a previously sent request that failed or may be an original request to program a route in underlay 116. At 604, local process 106 determines if the request is a retry or not. Local process 106 may determine if the request is a retry if a message is received from request server 118 indicating a request has failed. If the request is not a retry, then at 606, local process 106 places the route in priority queue 108 based on the priority of the route based on the process described in FIG. 4. For example, local process 106 may place the request behind any other routes with the same priority in priority queue 108.

If the request is a retry, at 608, local process 106 places the retry request in priority queue 108 based on a retry priority. The retry priority may place the retry route using a different method than an original request by using a higher priority than if the request was an original request. For example, local process 106 may place the retry route at the beginning of priority queue 108 if the route is of the highest priority. If the request is associated with other priorities, local process 106 may place the retry request in priority queue 108 before any other requests of the same priority. In yet other embodiments, local process 106 may place any retry route regardless of priority at the beginning of priority queue 108. Also, local process 106 may place only retry requests for priorities 1 and 2 at the beginning of priority queue 108. The different process for retry requests may ensure that retry requests may be retried faster than original requests, which may ensure that older requests for critical routes are retried before newer requests of the same priority. Although the above schemes are described, other schemes may be appreciated.

Figure 7A:
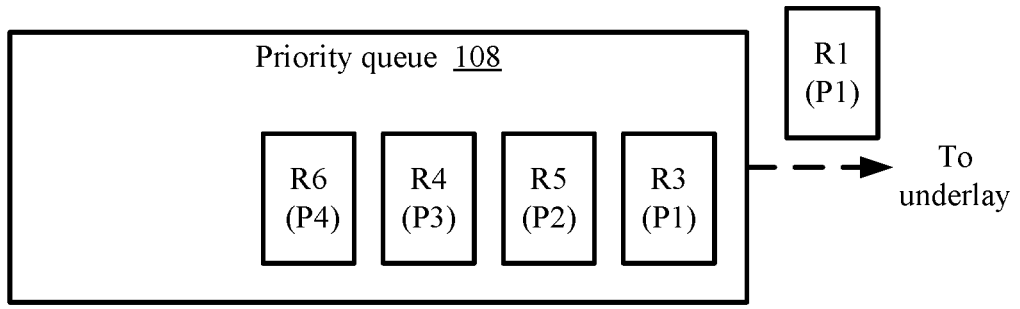
FIGS. 7A and 7B depict an example of placing a retry route in the priority queue according to some embodiments.
Figure 7B:
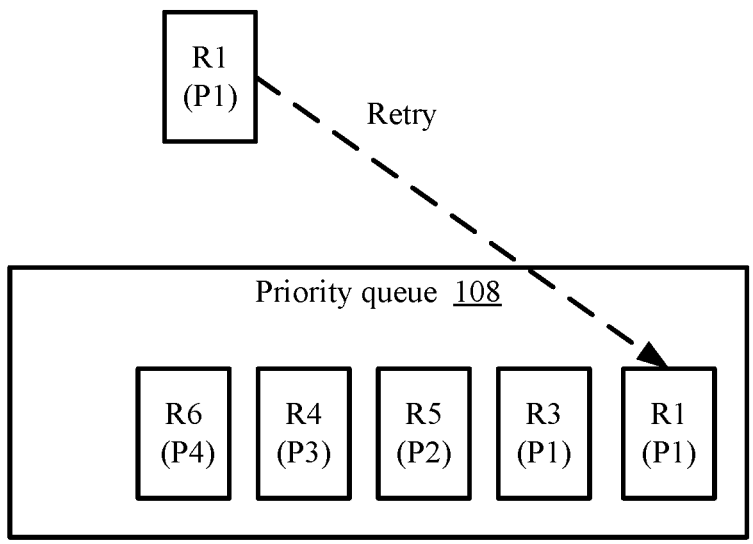

FIGS. 7A and 7B depict an example of placing a retry route in priority queue 108 according to some embodiments. In FIG. 7A, a request R1 is sent to underlay 116 for programming, which leaves requests for routes R3, R5, R4, and R6 in priority queue 108. In FIG. 7B, local process 106-2 receives a failure indication for a request for request R1. Request R1 includes a priority P1 that indicates it is the highest priority request. Local process 106 thus inserts request R1 at the beginning of priority queue 108 in front of request R3, which has the same priority P1 as request R1. Thus, request R1, which was issued before request R3, may be retried before request R3 and other requests in priority queue 108.

Conclusion

Accordingly, by using a priority queue 108, some embodiments may more efficiently program routes in underlay 116 that have a higher priority. By using priority queue 108 in respective hosts, a customer may control the requests that are processed in underlay 116 even though the customer does not have control over the request server 118 that processes the requests in underlay 116. Local process 106 may order requests in priority queue 108 according to pre-defined priorities or customized priorities. This may more efficiently send requests to underlay 116. Further, any retry request may be specially processed and placed in priority queue 108 such that high priority retries may be retried sooner or be given higher priority compared to other requests that have the same priority.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method for programming a route table that is used to route packets between hosts, the method comprising:
    storing, by a first host, a plurality of requests for routes in a queue based on respective priorities for the routes, wherein the plurality of requests are for programming destinations and next hops for the destinations in the route table that is used by a device in a network to route packets between hosts that are connected by the network;
    selecting, by the first host, a request for a route from the queue based on a respective priority for the queue; and
    sending, by the first host, the request for the route to an entity to program the route in the route table, wherein processing the request and other requests from one or more second hosts to program the route table is controlled by the entity and not the respective priority assigned to the request by the first host.

2. The method of claim 1, wherein sending the request for the route to the entity comprises:
    sending the request before sending another request in the queue, wherein the another request is associated with a lower priority than the request.

3. The method of claim 1, wherein storing the plurality of requests for routes in the queue comprises:
    storing the plurality of requests in an order based on respective priorities, wherein the request is selected based on the order.

4. The method of claim 1, wherein storing the plurality of requests for routes in the queue comprises:
    storing a request in the order with a retry priority when the request has failed from being previously being sent to the entity, wherein the retry priority is processed as a higher priority than an original priority assigned to the request.

5. The method of claim 1, wherein the processing of requests at the entity does not use the priority of the request.

6. The method of claim 1, wherein the respective priority for the plurality of requests comprises pre-defined priorities that are fixed for a first category of routes and customized priorities that can be assigned to a second category of routes.

7. The method of claim 1, further comprising:
    receiving the route to program in the route table for the network; and
    selecting a priority from a plurality of priorities based on an associated category of the route.

8. A non-transitory computer-readable storage medium containing instructions for programming a route table that is used to route packets between hosts, wherein the instructions, when executed, control a first host to be operable for:
    storing a plurality of requests for routes in a queue based on respective priorities for the routes, wherein the plurality of requests are for programming destinations and next hops for the destinations in the route table that is used by a device in a network to route packets between hosts that are connected by the network;
    selecting a request for a route from the queue based on a respective priority for the queue; and
    sending the request for the route to an entity to program the route in the route table, wherein processing the request and other requests from one or more second hosts to program the route table is controlled by the entity and not the respective priority assigned to the request by the first host.

9. The non-transitory computer-readable storage medium of claim 8, wherein sending the request for the route to the entity comprises:
    sending the request before sending another request in the queue, wherein the another request is associated with a lower priority than the request.

10. The non-transitory computer-readable storage medium of claim 8, wherein storing the plurality of requests for routes in the queue comprises:
    storing the plurality of requests in an order based on respective priorities, wherein the request is selected based on the order.

11. The non-transitory computer-readable storage medium of claim 8, wherein storing the plurality of requests for routes in the queue comprises:
    storing a request in the order with a retry priority when the request has failed from being previously being sent to the entity, wherein the retry priority is processed as a higher priority than an original priority assigned to the request.

12. The non-transitory computer-readable storage medium of claim 8, wherein the processing of requests at the entity does not use the priority of the request.

13. The non-transitory computer-readable storage medium of claim 8, wherein the respective priority for the plurality of requests comprises pre-defined priorities that are fixed for a first category of routes and customized priorities that can be assigned to a second category of routes.

14. The non-transitory computer-readable storage medium of claim 8, further operable for:
receiving the route to program in the route table for the network; and
selecting a priority from a plurality of priorities based on an associated category of the route.

15. A first host for programming a route table that is used to route packets between hosts, the first host comprising:
one or more computer processors; and a non-transitory computer-readable storage medium comprising instructions, that when executed, control the one or more computer processors to be operable for:
storing a plurality of requests for routes in a queue based on respective priorities for the routes, wherein the plurality of requests are for programming destinations and next hops for the destinations in the route table that is used by a device in a network to route packets between hosts that are connected by the network;
selecting a request for a route from the queue based on a respective priority for the queue; and
sending the request for the route to an entity to program the route in the route table, wherein processing the request and other requests from one or more second hosts to program the route table is controlled by the entity and not the respective priority assigned to the request by the first host.

16. The first host of claim 15, wherein sending the request for the route to the entity comprises: sending the request before sending another request in the queue, wherein the another request is associated with a lower priority than the request.

17. The first host of claim 15, wherein storing the plurality of requests for routes in the queue comprises: storing the plurality of requests in an order based on respective priorities, wherein the request is selected based on the order.

18. The first host of claim 15, wherein storing the plurality of requests for routes in the queue comprises: storing a request in the order with a retry priority when the request has failed from being previously being sent to the entity, wherein the retry priority is processed as a higher priority than an original priority assigned to the request.

19. The first host of claim 15, wherein the processing of requests at the entity does not use the priority of the request.

20. The first host of claim 15, wherein the respective priority for the plurality of requests comprises pre-defined priorities that are fixed for a first category of routes and customized priorities that can be assigned to a second category of routes.

* * * * *